Dec. 18, 1951  G. E. MIRFIELD ET AL  2,578,825
FLYING SAW ACTUATING MECHANISM
Filed Oct. 23, 1948  2 SHEETS—SHEET 1
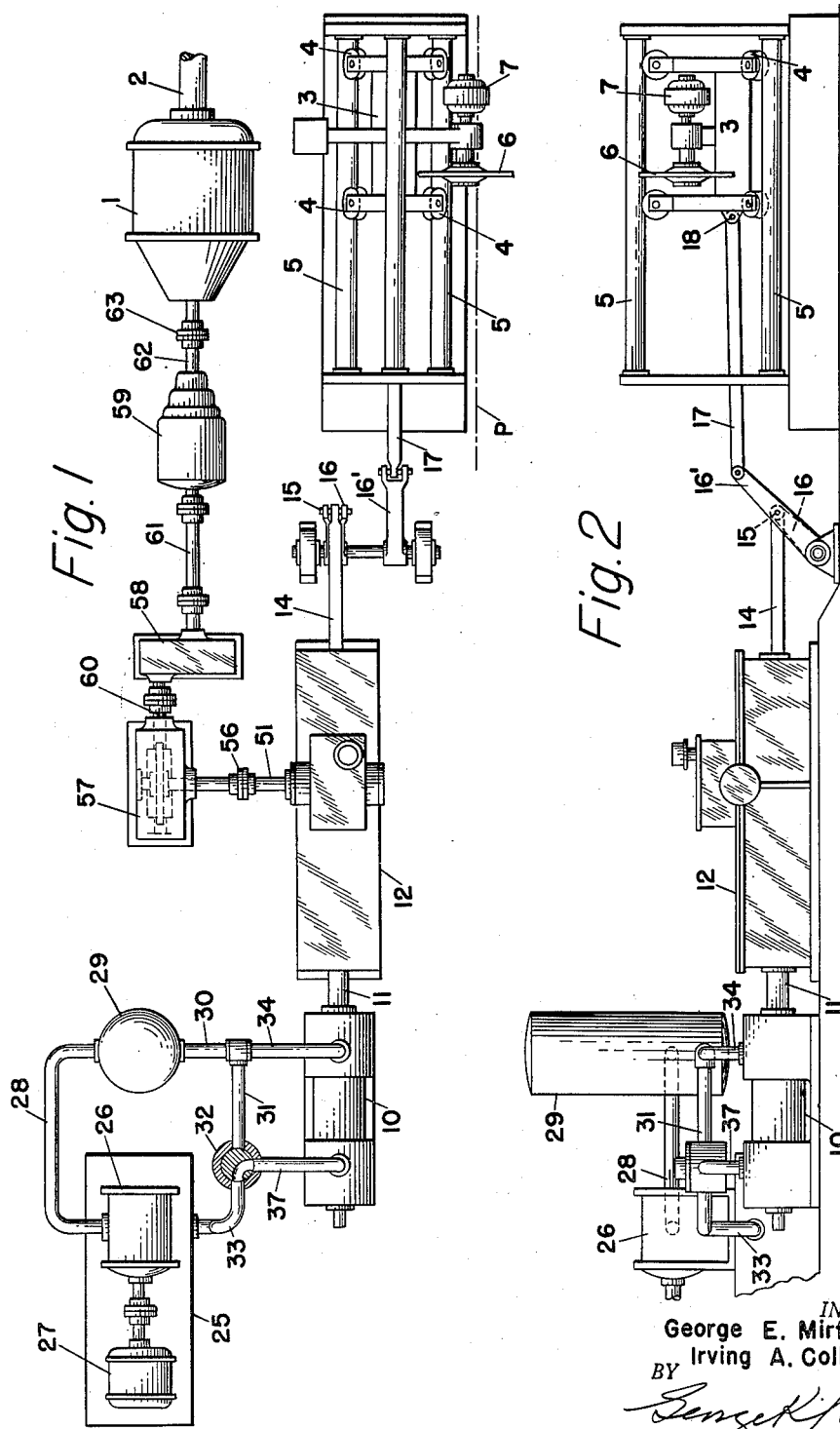
INVENTORS
George E. Mirfield
Irving A. Colby
BY
Attorney Dec. 18, 1951 G. E. MIRFIELD ET AL 2,578,825
FLYING SAW ACTUATING MECHANISM
Filed Oct. 23, 1948 2 SHEETS—SHEET 2
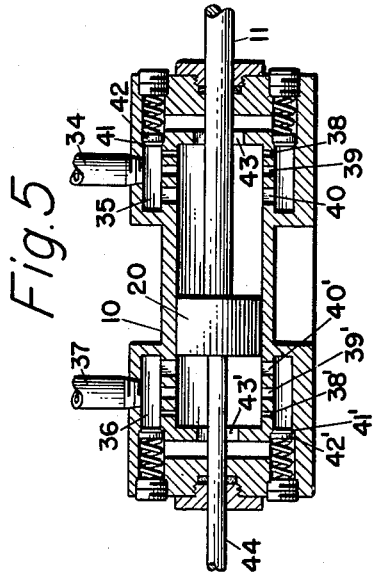
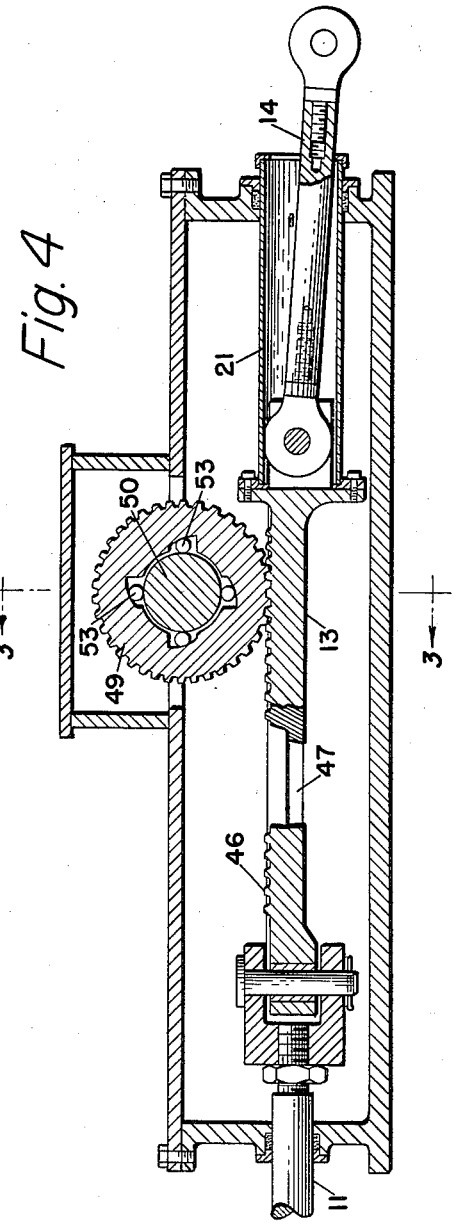
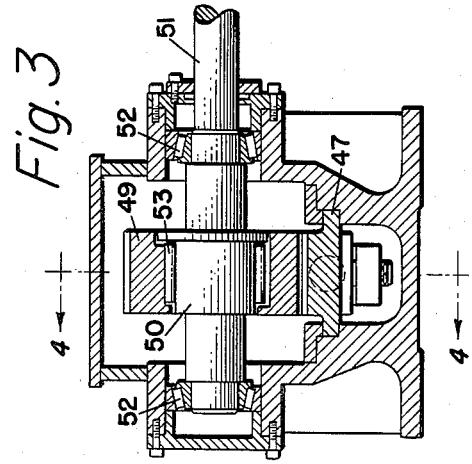
INVENTORS
George E. Mirfield
Irving A. Colby
BY
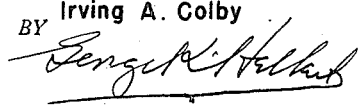
Attorney Patented Dec. 18, 1951

2,578,825

UNITED STATES PATENT OFFICE 2,578,825

FLYING SAW ACTUATING MECHANISM

George E. Mirfield, Youngstown, and Irving A. Colby, Hubbard, Ohio, assignors to The Youngstown Sheet and Tube Company, Youngstown, Ohio, a corporation of Ohio Application October 23, 1948, Serial No. 56,168

7 Claims. (Cl. 29—69)

This invention relates to apparatus for cutting moving stock such as pipe, tubing, rods and the like into pieces of predetermined length while the stock is being progressively generated as in a continuous mill with the operation of which the cutting apparatus is coordinated and synchronized.

For example, in the manufacture of butt weld pipe in a continuous butt weld mill, the stock as it is produced is delivered in a continuous length and moves axially from the mill along a rectilinear path adjacent which is arranged cutting mechanism, generally known as a "flying saw," operative to sever the stock at spaced points and thus reduce it to individual lengths of pipe, the latter term being used herein generically to include the stock both before and after severance as well as to designate any relatively rigid elongated finished or partially finished material similarly moving along a horizontal path and adapted for severance into lengths by mechanism disposed adjacent such path, and so to comprehend rods and tubes as well as the class of goods specifically known as pipe.

One cutting mechanism comprises a circular saw mounted on a table which is movable along ways parallel to the pipe path and is provided with means for translating the rotating saw laterally to project its edge across that path while the table and saw are moving forward parallel to and at approximately the speed of the pipe and for then retracting the saw from the pipe path after the cut is made and prior to return of the table to starting position, the table operating mechanism being connected to the mill drive in such way as to cause the table and saw to repeat their normal operating cycle at intervals so coordinated with the mill operation and resultant pipe production as to cut the pipe into uniform lengths. Necessarily the saw table and its associated elements must be fairly heavy to withstand the severe duty to which they are subjected, and it is apparent each cycle requires that the table carrying the saw proper, and usually its driving motor as well, be successively set in motion, brought to forward speed approximating that of the pipe, maintained substantially at that speed while it is being cut and the saw retracted from the said path, then brought to rest at the limit of its forward travel and finally returned to starting position, all in a relatively brief period of time; for example about 2.4 seconds when pipe generated at 500' per minute is being cut to 20' lengths.

Improvements in continuous pipe mills and in manufacturing procedure have progressively enhanced the speed at which pipe can be produced with, of course, corresponding lessening of the time available for completion of each operating cycle of the flying saw whereby greatly increased shocks and strains are imposed on most if not all its parts which result in increased repair and maintenance costs and shut-downs, in many cases tending in whole or in part to offset the advantages gained from the higher production rates.

It is therefore among the objects of our invention to provide improved means for association and combination with a continuous mill and flying saw assembly operative to actuate the saw table and to bring it to a stop at the ends of its travel hydraulically to thereby minimize starting and stopping shocks and excessive wear upon the parts in conjunction with means mechanically operative to restrict the maximum speed of forward movement of the table to substantial correspondence to the speed of the pipe whereby relative linear movement between the latter and the table during the cutting operation is substantially eliminated.

A further object is to provide speed control mechanism for the saw table including a shaft driven at a speed correlated with the linear speed of the pipe and having means interposed in its drive for preventing it from being rotated at a higher speed together with an overrunning clutch associated with the shaft including an element rotating with the shaft at all times and another element relatively rotatable in one direction only with respect to the first element operated from the saw table actuating mechanism in such manner that when the table is moving in the direction of the pipe and attains a speed equal thereto the second of said elements overtakes the first in its rotation with the shaft whereby movement of the table at any higher speed is prevented and the table speed thus maintained in properly correlated relation to that of the pipe while the cut is being made.

A still further object is to provide means for mechanically limiting the maximum forward speed of the table under the influence of its actuating means to the speed of the pipe during the cutting operation but which allows the table to travel at whatever speed in the reverse direction its actuating means is capable of imparting to it whereby after a cut has been made the table may be returned to starting position at a speed either above, below or equal to its maximum forward speed preparatory to initiation of the succeeding cycle.

Other objects, advantages and novel features of design, construction and assembly comprehended by or incident to the invention are hereinafter mentioned or will be readily apparent to those familiar with the art to which it relates.

In the accompanying drawings to which reference may now be had, Fig. 1 is a fragmentary diagrammatic plan view of a flying saw assembly of more or less conventional design with mechanism embodying the invention incorporated therein, and Fig. 2 is a side elevation thereof;

Fig. 3 is an enlarged fragmentary transverse section of the speed control unit included in said mechanism, taken on the line 3—3 in Fig. 4;

Fig. 4 is a similarly enlarged longitudinal section of said unit on line 4—4 in Fig. 3; and Fig. 5 is an enlarged fragmentary section on the same plane as Fig. 4 illustrating the hydraulic saw table actuating unit employed for starting, stopping and reversing the table during its normal cycle of operation, although it will be understood that other means for accomplishing the function of this unit may be substituted therefor if desired.

As the invention primarily contemplates the provision of means for automatically limiting the forward speed of the table to a maximum not substantially exceeding that of the pipe itself, no matter what be the speed of generation of the latter, without correspondingly limiting the table return speed, it will be understood both the saw table and the hydraulic actuating means therefor may be of conventional design and details of their construction and operation may therefore be largely matters of choice within limits imposed by the nature of the duties they are to perform, and as apparatus capable of fulfilling their respective functions is well known in the art the saw table and table actuating units selected for illustration in the drawings need herein be mentioned only in such detail as will adequately disclose their general character and purposes in association with our table speed governing mechanism. The latter is shown in greater detail and will be herein more fully described, and to facilitate a proper understanding of the invention we shall therefore first refer to the preferred general relationship and disposition of the several units illustrated.

Thus in Fig. 1 the line P designates the path of the pipe issuing from the delivery end of a continuous pipe or other mill of any suitable construction (not shown) which may be driven by a motor 1 through its main shaft 2. Adjacent path P is disposed a reciprocable saw table 3 supported and guided along a rectilinear path parallel thereto on rollers 4 engaging rails 5 whereby the table, carrying a rotating saw 6 driven by motor 7 may be reciprocated longitudinally along the rails, appropriate means (not shown) being provided for successively projecting the saw edge transversely across path P and retracting it therefrom during forward movement of the table, i. e. movement toward the left in Figs. 1 and 2.

For actuating the table we employ an hydraulic cylinder 10 suitably connected to a source of fluid under pressure and to an exhaust sump, the piston rod 11 of the cylinder projecting through a suitable gland into the speed governor unit housing 12 where it is connected by a yoke and pin to an extension 13, the other end of the extension carrying a link 14 pivotally connected by a pin 15 to a crank 16 on the same horizontal shaft as a corresponding crank 16' which is pivoted to one end of a connecting rod 17 secured at its opposite end by a pivot pin 18 to the saw table, provision of the two cranks serving to offset the path of the hot pipe from other parts of the assembly. Thus when fluid under pressure is supplied to cylinder 10 in such manner as to reciprocate therein a piston 20 carried by piston rod 11, the saw table is correspondingly reciprocated to bring the saw into play to sever the pipe and thereafter return the saw and its supporting table to starting position.

To provide a lubricant seal at the right hand end of housing 12 a sleeve 21 is secured to the proximate end of extension 13 and slidably projected through an appropriate gland in the housing wall, the sleeve surrounding link 14 and being of sufficient diameter to allow ample clearance for required oscillation of the link.

One convenient arrangement for supplying fluid under pressure to cylinder 10 is diagrammatically illustrated in Figs. 1 and 2 and comprises the exhaust sump 25 on which is mounted a pump 26 driven by a motor 27 operative to discharge fluid drawn from the sump through a pipe 28 to an accumulator tank 29, the latter thus being adapted to maintain a supply of fluid under pressure continuously available for feed to cylinder 10. For effecting this feed an outlet pipe 30 connects the accumulator 29 with a pressure line 31 controlled near one end by three-way valve 32 connected by a pipe 33 with exhaust sump 25 and, without the interposition of a control valve, connected by a pipe 34 to an annular manifold 35 adjacent one end of cylinder 10; a similar manifold 36 adjacent the other end of the cylinder is connected through a pipe 37 with the three-way valve 32. As shown in Fig. 5 manifolds 35, 36 respectively communicate with the interior of the cylinder through a plurality of series of radial ports 38, 39, 40 and 38', 39', 40' which in each series are progressively larger toward the middle of the cylinder, and additional ports 41, 41' controlled by spring pressed check valves 42, 42' connect the manifolds with axial ports 43, 43' at the cylinder ends. The axial length of piston 20 in the cylinder is greater than the distance subtended by the series of radial ports adjacent each of its ends while the piston guide rod 44 which projects axially from the piston in the direction opposite that of piston rod 11 is of less diameter than the latter and extends through a gland in the adjacent head of the cylinder to aid in guiding the piston therein. Valve 32 thus controls the passage of fluid from accumulator 29 to cylinder manifold 36 and from the latter to sump 25 and when actuated by suitable mechanism (not shown) preferably coordinated with the speed of movement of the pipe and the length of the sections thereof which it is desired to cut off is adapted to effect alternate admission and discharge of the fluid to and from said manifold.

Obviously, however, without means for controlling the linear speed of the saw table, the movement of piston 20 induced when the appropriate end of the cylinder is supplied with fluid under sufficient pressure and in sufficient quantity to effect rapid acceleration of the table at the beginning of its forward stroke might bring the table to a speed greatly exceeding that of the pipe during the cutting part of that stroke, and we therefore provide means for restricting the maximum speed of the table and so correlating it with that of the pipe as to insure substantial conformity between them during the cutting operation. For this purpose gear teeth 46 constituting a rack are provided on extension 13 of piston rod 11 which is slidable on ways 47 in housing 12. Meshing with the rack is a gear 49 which forms one element of an overrunning clutch a cooperative hub element 50 of which is carried by a shaft 51 supported transversely of the housing in bearings 52 and extending outwardly beyond the housing in one direction. The locking elements 53 of the overrunning clutch may be of any suitable character adapted to permit free relative rotation between clutch elements 49, 50 in one direction but to inhibit it in the other, whereby when shaft 51 is being driven at a constant rotative speed in one direction, e. g. clockwise in Fig. 4, and gear 49 attains corresponding speed in the same direction locking elements 53 are automatically brought into play so the gear cannot exceed that speed so long as hub element 50 is restrained from exceeding it.

In the illustrated embodiment of the invention shaft 51 is shown as positively driven from mill motor 1, although it may be driven by a separate motor or other driving means suitably coordinated in speed with the mill motor and hence with the speed of the mill, in such manner that the rotative speed of the shaft is correlated to the normally constant linear speed of the pipe as it leaves the mill. To this end shaft 51 is connected through a flexible coupling 56 with a worm gear reducing train 57, the latter being driven through a further series of speed reducers 58, 59 and shafts 60, 61 while drive shaft 62 of reducer 59 is connected through a flexible coupling 63 with main shaft 2 of mill motor 1. Thus in perhaps the most simple way is the rotative speed of shaft 51 constantly correlated through a geared direct drive with the speed of the mill motor, while the worm gearing of reducing train 57 is effective to negative any tendency of shaft 51 to exceed this speed after gear 49 has overtaken the cooperative overrunning clutch hub element 50 when but for the locking effect of the worm drive the high potential speed of gear 49 might increase the speed of shaft 51 to a higher rate and allow the linear speed of the table to exceed that of the pipe.

To more fully explain the source of this potential urge of the table to exceed the speed of the pipe which, however, as just explained is controlled by shaft 51 and its driving mechanism, reference may now be had more particularly to the details of the fluid system of cylinder 10. As has been indicated, the end of this cylinder nearest the saw table, i. e. the right hand end in Fig. 5, has its manifold 35 always connected directly with the accumulator wherein a supply of fluid under pressure is constantly maintained by pump 26, while manifold 36 at the other end of the cylinder may be connected with accumulator 29 or with sump 25 or closed off from both depending on the position of valve 32. Consequently, assuming the piston is at the extreme right hand end of the cylinder, the cylinder full of fluid and valve 32 in position to close off pipe 37 leading from manifold 36, the piston remains at rest and hence the saw table is likewise at rest at the extreme right hand end of its travel as indicated in Figs. 1 and 2, that is, in position to commence a cutting cycle. Now if it is desired to actuate the saw table the valve is operated to connect pipes 33 and 37, thereby immediately allowing fluid to escape from the left hand end of the cylinder as fluid in manifold 35 under pressure from the accumulator passes through check valves 42 and axial port 43 to drive the piston toward the left. As the piston successively passes radial ports 38, 39, 40 in the cylinder walls these provide additional access for progressively increasing volumes of the fluid and the piston and consequently the saw table are thereby rapidly and smoothly accelerated to a high linear speed which if unrestrained would soon exceed that of the pipe. But as has been explained, when the pipe speed has been attained by the table any further increase in the speed of the latter is inhibited by the speed control unit as described and the table therefore moves along with the pipe while the cutting of the latter is carried out by the saw in the normal manner, without risk of injury to the pipe and/or the equipment which may result if the speed of the table differs from that of the pipe during the cutting.

As the piston approaches the left hand end of the cylinder after the saw has completed its cut and has moved out of path P, it first overlies and thereby closes the largest ports 40' of the series of radial ports 38', 39', 40' in the cylinder wall, thus materially reducing the aggregate area of the avenues of escape of the fluid being exhausted from the space in front of the piston. This substantially increases the resistance of the fluid to further motion of the piston and initiates its rapid but smooth deceleration, which progresses at an increasing rate as the next set of ports 39' in each series is covered so that as the piston approaches the last and smallest of these ports, viz. ports 38', its forward speed is finally checked and it comes to a stop just as it fully covers all the ports and so inhibits further escape of fluid through them; throughout this portion of the cycle check valves 42' of course remain closed as their function is to admit fluid from manifold 36 to the cylinder through axial port 43' and to obstruct its flow in the opposite direction.

The table thus brought to rest at the end of its forward stroke is now returned to starting position by operation of valve 32 to disconnect manifold 36 from the exhaust sump and connect it with the accumulator, whereupon the full pressure of the latter is promptly exerted in that manifold to open check valves 42' and allow the pressure per unit area on both ends of the piston to equalize. The effective piston area to the left in Fig. 5 being greater than that to the right, due to the differential diameters of piston rod 11 and guide rod 44, the piston now moves toward the right, and as it progressively uncovers radial ports 38', 39' and 40' near the start of its return, the increasing access of fluid from manifold 36 promotes its acceleration as a corresponding quantity of fluid is forced from the opposite (right hand) end of the cylinder back through pipes 34 and 30 toward the accumulator. As the piston nears the end of the return stroke it progressively covers and thereby closes the right hand radial cylinder ports 40, 39, 38 and its deceleration is thereby quickly and smoothly effected in substantially the same manner as heretofore described in connection with completion of its forward stroke. The table is thereby brought to rest at its initial position without having been subjected at any time during the cycle to severe shock of too rapid acceleration or deceleration or excessive wear on any of its parts or those of auxiliary apparatus. It is of course substantially immaterial what speed the table attains during the return stroke as the saw is inoperative during this portion of the cycle, so of course the speed governing unit does not affect its return speed in any way since the reverse rotation of gear 49 is in the direction relatively to the cooperative hub element 50 in which the clutch locking elements are ineffective to bind the gear and hub element together no matter what their relative speeds.

It will of course be appreciated that when the saw is in fully automatic operation suitable electrical and/or mechanical means are provided for actuating the three-way valve 32 in properly timed relation to effect the cycle but as apparatus adapted for performing this function is readily available and its use for operating a valve of this character, which may be of any suitable construction, is well understood, no specific description of it is required, the valve per se and the means employed for operating it forming no part of the present invention.

It will be apparent from the foregoing that our invention provides means for actuating a saw table wherein the motive power for the table is derived entirely from fluid under pressure and that the same fluid provides a cushioning effect for rapidly and smoothly decelerating the table at the ends of its travel while mechanical means having positively controlled fixed predetermined speed relation to the linear speed of the pipe are employed for insuring precise correspondence between the linear speed of the table and that of the pipe as the latter is severed by the saw. It is therefore substantially impossible for the saw and/or the pipe to be damaged in normal operation as a result of relative linear movement between them while in mutual engagement; moreover due to the manner in which the mechanism as a whole is constructed and operated the life of its several parts is greatly prolonged as compared with flying saws reciprocated by mechanical means, even when hydraulic and/or pneumatic means are provided to assist them in accelerating or decelerating the table. Consequently since it is unessential that any of the elements embodied in our apparatus be employed in the specific form and/or relationship to other elements herein shown and described, it will be understood we do not desire or intend to limit or confine ourselves thereto in any way, as comparable and equivalent elements of many different types and embodiments may no doubt be utilized in lieu of certain of them and changes and modifications in their relationship, mode of operation, construction and specific function will readily occur to those skilled in the art and may be made if desired without departing from the spirit and scope of the invention as defined in the appended claims.

Having thus described our invention, we claim and desire to protect by Letters Patent of the United States:

1. In combination with a flying saw assembly adapted to cut continuously generated pipe into sections while the pipe is moving axially comprising a saw carrying table reciprocable parallel to the path of the pipe, a shaft, means adapted to drive the shaft at a predetermined speed in relation to the speed of movement of the pipe including a worm and a worm gear meshing therewith operative to restrict the shaft from exceeding that speed, an overrunning clutch on the shaft, a gear interconnected with the shaft through said clutch, a reciprocable rack meshing with the gear, connected with the table and movable therewith, and hydraulically actuated means for reciprocating the table, the clutch including an element operative to lock the gear and shaft together when the table attains a speed equal to that of the pipe and in the same direction.

2. In combination with a flying saw assembly adapted to cut continuously generated pipe into sections while the pipe is moving axially comprising a saw carrying table reciprocable parallel to the path of the pipe and means for reciprocating the table, an overrunning clutch comprising parts relatively rotatable in one direction and relatively non-rotatable in the opposite direction, means for rotating one of said parts in coordinated speed and directional relation with the movement of the pipe, means for rotating the other of said parts in coordinated speed and directional relation with the movement of the table and means for inhibiting acceleration of said first, by said second rotating means including a worm and a worm gear meshing therewith whereby when the table moving in the direction of travel of the pipe reaches substantially the speed of the latter said clutch parts attain relatively non-rotatable relation and the table is restrained from exceeding that speed.

3. In a flying saw assembly adapted to cut continuously generated pipe into sections while the pipe is moving axially, a saw carrying table reciprocable parallel to the pipe path, hydraulically actuated means for reciprocating the table, a shaft, means for continuously driving the shaft in one direction in coordinated speed relation with the speed of the pipe including a worm and a worm gear meshing therewith inhibiting rotation of the shaft independently of said driving means, an element movable with the table, and means interposed between the element and the shaft operative to allow the table under the influence of said hydraulically actuated means to freely accelerate in one direction from zero to a speed corresponding to that of the pipe and to then positively lock the element to the shaft to inhibit further acceleration during succeeding movement of the table in said direction by said hydraulically actuated means.

4. In a flying saw assembly adapted to cut continuously generated pipe into sections comprising a saw carrying table reciprocable parallel to the path of the pipe, means operable to reciprocate the table including a cylinder and an hydraulically operated piston therein, a rack connected with the piston and interconnected with the table, a gear meshing with the rack, means operable to alternately admit fluid to the ends of the cylinder, a shaft, a driving motor therefor operable at a speed coordinated with the speed of movement of the pipe, a gear train comprising a worm and worm gear interposed between the motor and the shaft, and an overrunning clutch interposed between the shaft and the gear meshing with the rack adapted to allow said gear to rotate relatively to the rotating shaft while the table and rack under the influence of the hydraulically operated piston accelerate from zero to a speed corresponding to that of the pipe and to then lock the gear and shaft together, said worm and worm gear during succeeding movement of the table and rack inhibiting overdrive of the shaft through said gear and resultant further acceleration of the table and rack.

5. In table speed control means for a flying saw assembly adapted to cut continuously generated pipe into sections comprising a saw carrying table reciprocable parallel to the path of the pipe, means operable to reciprocate the table including a cylinder and an hydraulically operated piston therein, a rack connected with the piston and interconnected with the table, a gear meshing with the rack, means operable to alternately admit fluid to the ends of the cylinder, a shaft, a driving motor therefor operable at a speed coordinated with the speed of movement of the pipe, that improvement which comprises a gear train including a worm and worm gear interposed between the motor and the shaft, and an overrunning clutch interposed between the shaft and the gear meshing with the rack adapted to allow said gear to rotate relatively to the rotating shaft while the table and rack under the influence of the hydraulically operated piston accelerate from zero to a speed corresponding to that of the pipe and to then lock the gear and shaft together, said worm and worm gear during succeeding movement of the table and rack inhibiting overdrive of the shaft through said gear and resultant further acceleration of the table and rack while the saw is making the cut preparatory to subsequent deceleration of the piston, the clutch during such deceleration unlocking the gear from the rotating shaft to enable the gear to gradually come to rest.

6. In table reciprocating means for a flying saw assembly adapted to cut continuously generated pipe into sections comprising a saw carrying table reciprocable parallel to the path of the pipe, said table reciprocating means including a cylinder and an hydraulically operated piston therein, and means operable to selectively direct fluid under pressure into the cylinder on opposite sides of the piston, that improvement which comprises a series of ports of progressively decreasing effective area proximate each end of the cylinder, the smallest port in each series lying proximate the outer end of the cylinder and the piston being of a length to span all the ports in either series when aligned therewith, whereby as the piston moves toward either end of the cylinder under the influence of fluid directed into the other end thereof the ports adjacent the latter end are progressively opened to admit additional fluid and the ports adjacent the opposite end progressively closed to restrict the exhaust of fluid therethrough to thereby build up increasing resistance to the movement of the piston.

7. In the cylinder and hydraulically operated piston assembly of the table reciprocating means of a flying saw assembly adapted to cut continuously generated pipe into sections comprising a saw carrying table reciprocable parallel to the path of the pipe, and means operable to selectively direct fluid under pressure into the cylinder on opposite sides of the piston, that improvement which comprises a series of ports of progressively decreasing effective area proximate each end of the cylinder, the smallest port in each series lying proximate the outer end of the cylinder and the piston being of a length to span all the ports in either series when aligned therewith, whereby as the piston moves toward either end of the cylinder under the influence of fluid directed into the other end thereof the ports adjacent the latter end are progressively opened to admit additional fluid and the ports adjacent the opposite end progressively closed to restrict the exhaust of fluid therethrough to thereby build up increasing resistance to the movement of the piston.

GEORGE E. MIRFIELD.
IRVING A. COLBY.

REFERENCES CITED

The following references are of record in the file of this patent:

UNITED STATES PATENTS

| Number | Name | Date |
| --- | --- | --- |
| 1,837,435 | Hoch | Dec. 22, 1931 |
| 1,892,834 | Grosbost | Jan. 3, 1933 |
| 2,086,374 | Wikle et al. | July 6, 1937 |
| 2,232,514 | Day | Feb. 18, 1941 |
| 2,262,619 | Morris | Nov. 11, 1941 |
| 2,271,145 | McKinney | Jan. 27, 1942 |